United States Patent [19]

Schon

[11] Patent Number: 4,744,414

[45] Date of Patent: May 17, 1988

[54] PLASTIC FILM PLATE-TYPE HEAT EXCHANGER

[75] Inventor: Steven G. Schon, Philadelphia, Pa.

[73] Assignee: Arco Chemical Company, Newtown Square, Pa.

[21] Appl. No.: 902,990

[22] Filed: Sep. 2, 1986

[51] Int. Cl.$^4$ .............................................. F28F 3/08
[52] U.S. Cl. ..................................... 165/167; 165/905
[58] Field of Search .............. 165/167, 905, 906, 907, 165/914

[56] References Cited

U.S. PATENT DOCUMENTS

| | | | |
|---|---|---|---|
| 1,710,818 | 4/1929 | Fosbury | 165/167 X |
| 2,960,160 | 11/1960 | Goodmann | 165/167 X |
| 3,228,465 | 1/1966 | Vadot | 165/167 |
| 4,085,728 | 4/1978 | Tomchak | 165/170 X |
| 4,190,101 | 2/1980 | Hartmann | 165/905 X |
| 4,355,636 | 10/1982 | Oetjen et al. | 165/907 X |
| 4,407,358 | 10/1983 | Muellejans et al. | 165/166 |
| 4,516,632 | 5/1985 | Swift et al. | 165/166 X |

FOREIGN PATENT DOCUMENTS

| | | | |
|---|---|---|---|
| 490821 | 7/1948 | Canada | 165/167 |
| 1354502 | 5/1974 | United Kingdom | 165/905 |

*Primary Examiner*—Ira S. Lazarus
*Assistant Examiner*—Peggy A. Neils
*Attorney, Agent, or Firm*—Lewis J. Young

[57] ABSTRACT

This invention relates to low cost heat exchangers of the parallel plate-type useful for recovery or dissipation of heat energy in buildings of all types, including homes, office buildings and factories, as well as for heat recovery in the chemical process, electrical power and other industries.

15 Claims, 3 Drawing Sheets

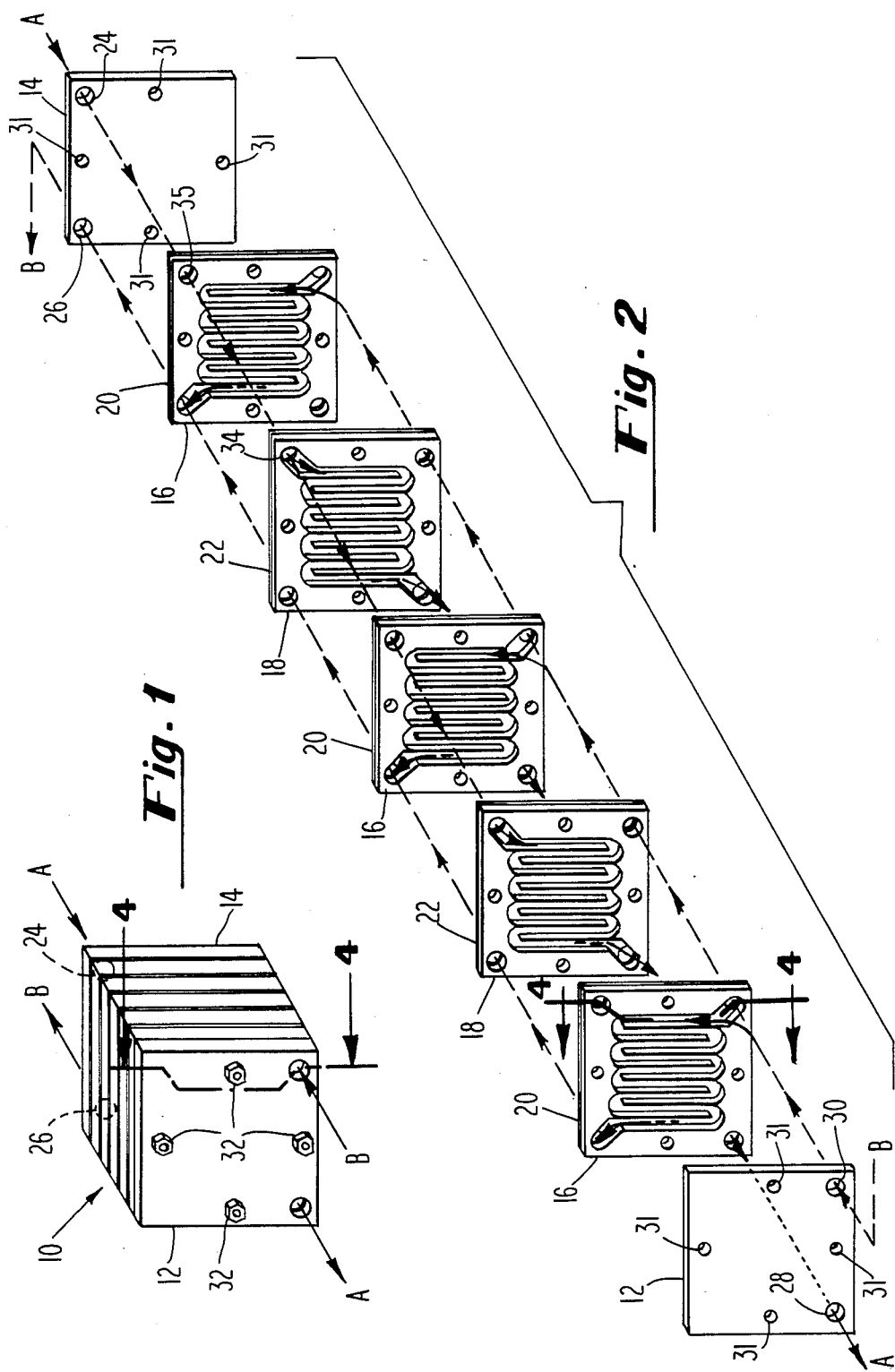

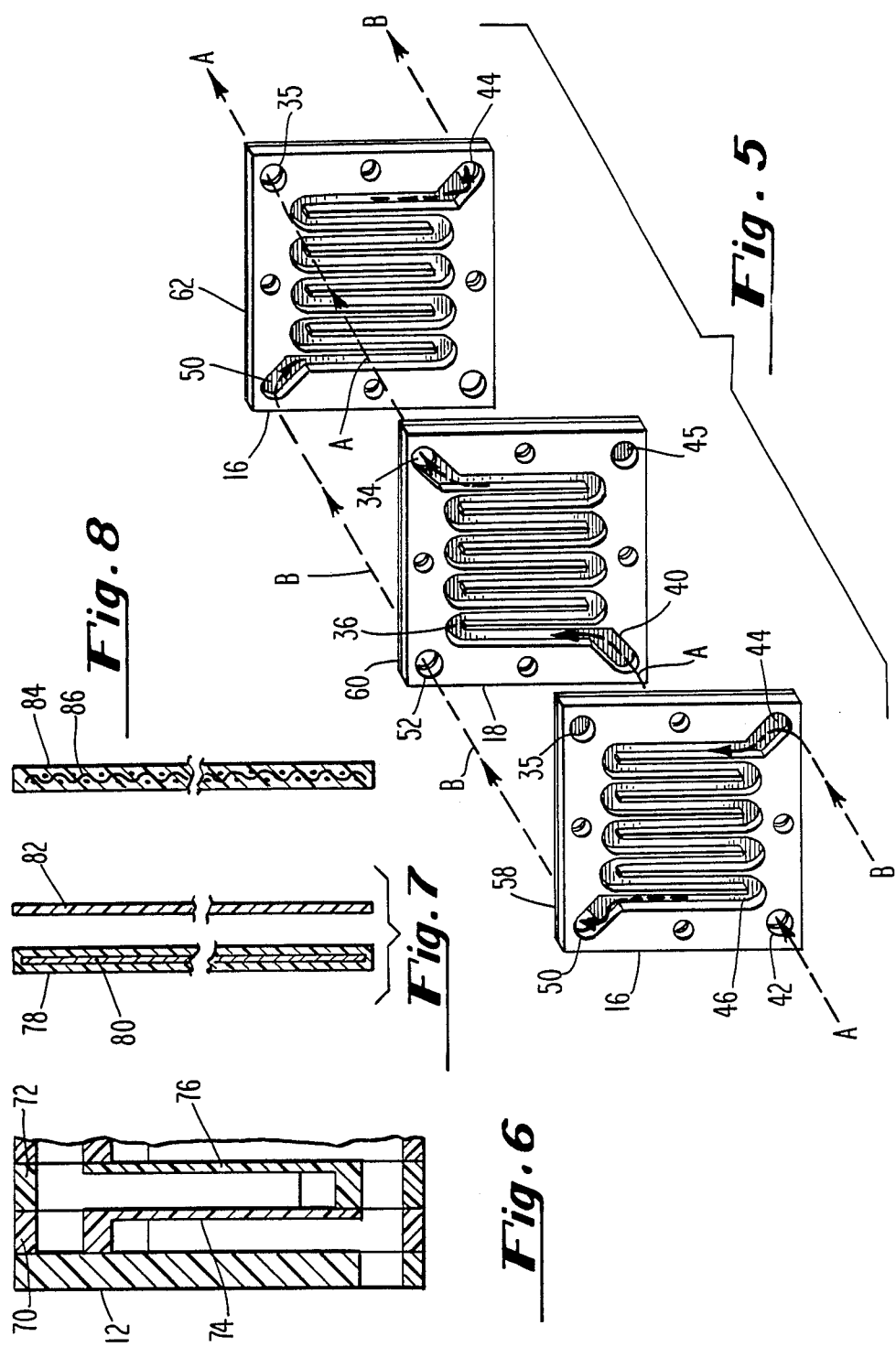

PLASTIC FILM PLATE-TYPE HEAT EXCHANGER

BACKGROUND OF THE INVENTION

Conventionally, industrial heat exchangers have been fabricated from metals. Such exchangers are relatively expensive because of the materials, complex design and the high costs for welding, assembly and other aspects of fabrication. The costs have been prohibitively expensive for installation in homes and non-industrial environments such as office buildings, particularly where the need is for heat exchange or heat exchange combined with ventilation including humidification or dehumidification.

In attempting to reduce the cost of heat exchangers for domestic and office building use, plastic materials have been utilized such as laminations of polyethylene film mounted within a wood housing and capable of heat exchange between inside and outside air when used in conjunction with ventilation of substantially air-tight homes, as described in *Popular Science*, October 1980, pages 77–80. Industrial heat exchangers have also incorporated plastic heat exchange surfaces, as reviewed in "Nonmetallic Heat Exchangers: A Survey of Current and Potential Designs for Dry-Cooling Systems", Electrical Power Research Institute (EPRI), Palo Alto, Calif. 94304, 120 pages particularly Sections 3, 4 and 5, and in U.S. Pat. Nos. 3,256,930 to Norback, 3,489,209 to Johnson and 4,286,365 to Creighton. The heat exchanger designs of the foregoing publications and patents include capillary falling water film between nonrigid sheets of plastic film, plastic plate types similar in function to tubular solar collectors, aluminum plates laminated between plastic sheets, corrugated plastic tubing, and various smooth, bare, parallel plate exchangers utilizing air flow between the plates.

All of the foregoing designs involve the use of low cost plastic and other materials, but the high labor cost for fabrication of these somewhat complex designs remains a deterrent for their use in other than industrial applications, such as the chemical process and electrical power industries.

SUMMARY OF THE INVENTION

In accordance with the present invention, it has now been found that substantial economies can be achieved in material and fabrication costs by a plate-type heat exchanger wherein a series of plastic separator plates alternating with plastic film as the heat transfer surface are stacked between a pair of end plates, and the separator plates and film are locked together to form a closed pack. Each of the separator plates has a slot in the plane thereof, the open side of the slot being bounded to adjacent film to define a flowpath for a first fluid. The second separator plate also has a slot in the plane thereof, similarly having an open side bounded by the adjacent film to define a flowpath for a second fluid. The separator plates and the slots therein are so positioned that the fluids flow through the respective slots on opposite sides of the film which bounds the slots, thereby providing heat transfer through the film.

Additionally, in one embodiment of the invention the pack may have a first channel extending transversely through the separator plates and film to communicate with the slot in the first separator plate for passage of the first fluid into the slot and from one end of the pack to the other. Similarly, the pack may have a second channel extending transversely through the separator plates and film to communicate with the slot in the second separator plate for passage of the second fluid end to end in the pack and in the slot of the second separator plate.

In other aspects of the invention, the slots are shaped to define baffle surfaces along their edges or sides, the slots define serpentine flowpaths, and the heat exchanger comprises a plurality of first and second plastic separator plates alternating in the pack, each such separator plate being separated from an adjacent plate by a plastic film.

Still other aspects of the invention include a plate-type heat exchanger pack as described but also including plastic end plates and means for locking the plates and film in the closed pack, such as mechanical fasteners and plastic bonding agents.

The separator plates and/or end plates may also contain reinforcing materials, in accordance with still another aspect of the invention, for additional strength. The fabrication of the heat exchangers is simplified by forming the slots in the separator plates as serpentine cutouts, alternate separator plates then being positioned in mirror image relationship with the film being fabricated integral with the separator plates or bonded thereto in a subsequent step. Moreover, although the heat exchangers of the invention are directed primarily to heat exchange, the use of water vapor permeable plastic film permits use of the heat exchangers for humidification and dehumidification, often jointly with ventilation.

The invention provides all the advantages of plate-type heat exchangers, such as compact size, low pressure drop, addition or removal of plates as needed and ease of disassembly for maintenance or repairs, in combination with the advantages of plastic materials, including selection from a wide variety of plastics, self-insulating properties, specific chemical resistance, self-sealing benefits by the use of flexible polymer materials, low weight and lower installation costs.

The foregoing and other aspects, features and advantages of the invention will be apparent from the description which follows.

DESCRIPTION OF THE DRAWINGS

In the drawings:

FIG. 1 is a perspective, partially diagrammatic view, of one embodiment of heat exchanger pack of the invention;

FIG. 2 is an exploded view of the heat exchanger pack of FIG. 1;

FIG. 5 is a detailed perspective view similar to that of FIG. 3 showing an alternate arrangement of plates and film in another embodiment of heat exchanger of the invention;

FIG. 6 is a fragmentary, vertical cross-section similar to FIG. 4 showing an alternate embodiment of separator plate and film;

FIG. 7 also is a fragmentary, vertical cross-section showing a reinforced embodiment of separator plate in combination with a gasket; and FIG. 8 is a fragmentary, vertical cross-section of another form of reinforced separator plate useful in the heat exchanger of the invention.

DETAILED DESCRIPTION

Figure 3:
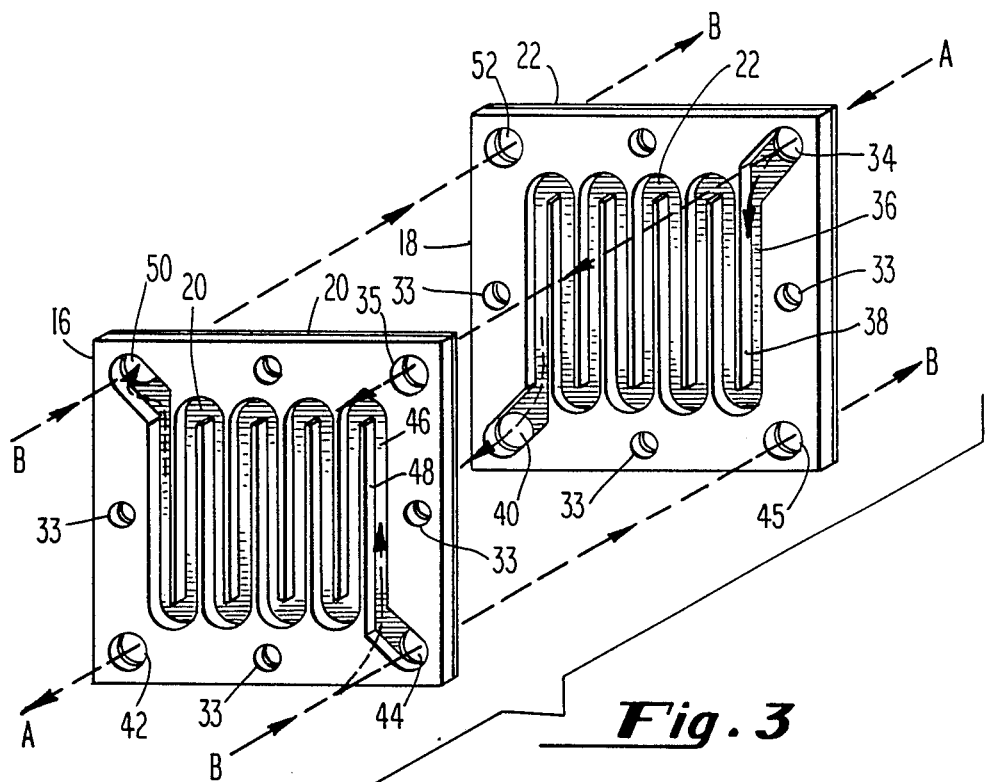
FIG. 3 is a detailed perspective view of two adjacent plates of those shown in FIG. 2.
Figure 4:
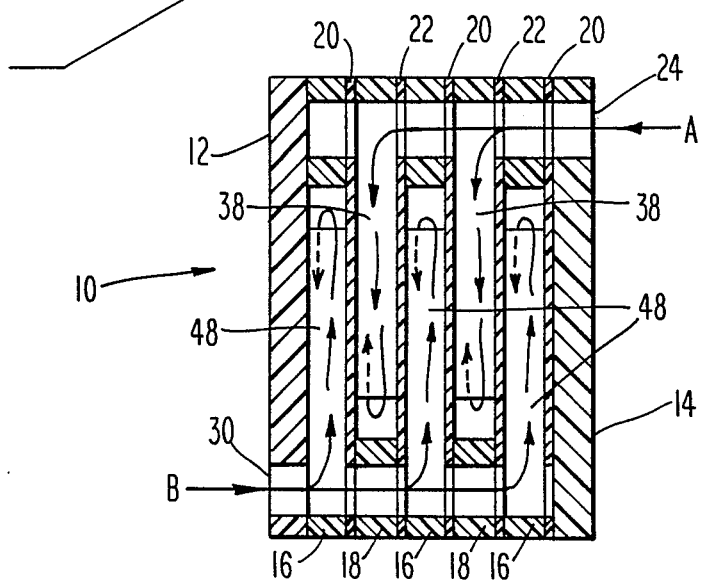
FIG. 4 is a vertical section along the line 4—4 of FIG. 2 showing the internal structure transversely of the pack of FIGS. 1 and 2.

With reference to FIGS. 1-5, there is shown one embodiment of heat exchanger pack 10 of the invention wherein a pair of end plates 12 and 14 have successively stacked between them at least one first plastic separator plate 16, at least one second plastic separator plate 18 and at least one separator film 20. While the invention includes the combination of only two plastic separator plates and a single separator film therebetween, better heat exchange normally is obtained, as shown in FIGS. 1, 2 and 4, by combining a plurality of first and second separator plates 16 and 18, each pair of first and second separator plates being separated by a plastic film 20 and 22. Optionally, gaskets (not shown) may be used between the separator plates to improve sealing.

End plates 14 and 16 may be formed of any material having suitable strength for compressing and compacting the separator plates and films to form pack 10 and to insulate the fluids in the pack, such as metal, plastic, wood or any combination thereof. From the standpoint of ease of fabrication and low cost, plastic is the preferred material. Both solid plastic and a closed-cell foam plastic are suitable, the latter providing self-insulating properties, thus eliminating the need and expense of external thermal insulation. Representative plastics are the polyolefins such as polypropylene, polyethylene and polybutylene; polyvinylchoride; polycarbonate; polystyrene; ABS copolymers; polyester; nylon; and any of such plastics and other engineering plastics reinforced with metal and/or glass fiber or other materials such as reviewed in the EPRI publication cited above.

End plate 14 has a port 24 for entry of a first fluid (A) and second port 26 for exit of a second fluid (B). Similarly, end plate 12 has a port 28 for exit of first fluid A and a port 30 for entry of second fluid B. As will become more apparent from the description following, ports 24 and 28 are portions of a first channel extending transversely through pack 10, and ports 26 and 30 are portions of a second channel also extending transversely through pack 10. In alternate embodiments, at least one of the fluid ports (24, 26, 28, 30) may be located in other than the end plates 14 or 16, such as in either a first separator plate 16 or in a second separator plate 18, to communicate directly with the appropriate slot in the separator plate for passage of fluid.

The separator plates, films and end plates include means for locking the plate 10 in a closed pack. Such means include tie rods (not shown) extending through one or more openings 30 in the end plates and separator plates, fastened by nuts 32 as shown in FIG. 1. Optionally, the components may be locked together in the pack by solvent, fusion or ultrasonic bonding.

The flow of fluids A and B through pack 10 is indicated in FIGS. 2 through 4. As shown more particularly in FIGS. 2 and 3, fluid A, after entering through port 24 in end plate 14, flows through port 35 in separator plate 16, and then into port 34 in separator plate 18. A first portion of fluid A continues through plate 18 and through the next adjacent plate 16 via port 35, and then into the next adjacent plate 18. A second portion of fluid A flows into slot 36 in plate 18 against or alongside baffle 38 defined by an edge, side or wall of the slot. Slot 36 is bounded on its open side or sides by film 22. As illustrated in FIG. 3, the slot 36 may be formed as a groove, cutout or aperture through plate 18. To operate as a flowpath for fluid A, slot 36 must be bounded on both sides of plate 18 with films 20 and 22. Thus contained, a portion of fluid A follows a flowpath along the baffles 38 defined by the sides or walls of slot 36 and exits from port 40 into port 42 of plate 16.

From port 35 of plate 16, a portion of fluid A that bypassed slot 36 of the preceding plate(s) 18 follows a path through the next plate 18 while a second portion continues through a similar port 35 through next adjacent plate 20. As shown in FIG. 2, the fluid A exits the flowpath of slot 36 in the second plate 17, and exits from port 40, joining with the fluid A exiting from each plate 18 in the stack ultimately exiting from port 28 in end plate 12.

Fluid B follows a path similar to the path of fluid A but in alternate plate 16 rather than 18. As more particularly seen in FIGS. 2 and 3, fluid B enters end plate 12 at port 30 and separator plate 16 at port 44. A portion of fluid B continues through plate 16 and through the next adjacent plate 18, via port 45 and then into the next adjacent plate 16. A second portion of fluid B follows the flowpath in slot 46 of plate 16 having edges or walls operating as baffles 48, and then exiting via port 50 and port 52 of the adjacent plate 18. This flowpath is repeated in subsequent plates 16 and 18 as indicated in FIG. 2.

While the drawings show serpentine flowpaths for fluids A and B it will be understood that the slots may have any other configuration effective for heat exchange, including zigzag, circular and other regular or irregular paths.

It will thus be evident that by reason of the film 20 separating plates 16 and 18 and the placement of slots 36 and 46, fluids A and B will be separated while in their flowpaths only by film 20, thus providing for heat exchange between the fluids through the film.

Although as shown in the drawings the slots 36 and 46 are formed as voids through the entire plane of the separator plates, adequate heat transfer can also be attained by forming the slots as grooves in the plates, i.e., as channels which do not go entirely through the plates.

Because the flow of fluids A and B is both transversely through pack 10 and serpentinely across the surfaces of films 20 and 22 within slots 36 and 46, the ports thereto operating as manifolds, such flow is said to be parallel as between the respective slots and such flow is conveniently achieved by all of the ports being open and by counter-current passage of fluids A and B as indicated in FIGS. 2-4.

However, by merely closing some of the ports with a film 20 or 22 and/or changing the flow of fluids A and B from counter-current to concurrent, serial flow may be achieved. This is illustrated in FIG. 5 wherein film 58 in contact with separator plate 16 closes ports 35 and 44 and in next adjacent plate 18, a film 60 closes ports 40 and 45. In addition, the next separator plate 16 is in contact with a film 62 which closes port 50. The result is that fluid A entering port 42 of plate 16 flows serially through the three plates illustrated in FIG. 5, that is, flows in a continuous path without division of direction as in the flow shown in FIG. 2 and 3. In like manner, fluid B entering port 44 of plate 16 flows through the serpentine path defined by slot 46, exiting at port 50 through port 52 of next adjacent plate 18 and then into the serpentine path defined by slot 46 in the next plate 16, finally exiting via port 44.

Although FIG. 5 shows fluids A and B entering through the same end plate in the stack, thereby providing co-current flow, fluids A and B may also enter through opposite end plates in the stack, resulting in counter-current flow.

Although the flowpaths of the fluids in the two configurations illustrated by FIGS. 3 and 5 are different, the separator plates 16 and 18 themselves are identical, being oriented in the heat exchanger pack in an alternately inverted manner, i.e., as mirror images. Consequently, the plates 16 and 18 may be molded or otherwise fabricated as a single structure and the flowpaths are controlled by placement of the heat exchange film surfaces therebetween in the manner described.

From the standpoint of fabrication ease, as shown in FIG. 6, the films in the separator plates may be formed integral with the separator plates as illustrated by separator plates 70 and 72 and films 74 and 76. The composites of separator plates and films then may be compacted and locked together in any suitable manner with end plates 12 and 14 to form a heat exchanger pack of the invention.

For certain applications, e.g., where higher operating pressures and/or higher thermal conductivity is required, it may be desirable to reinforce portions of the heat exchanger. For example, as illustrated in FIGS. 7 and 8, a separator plate may comprise a plastic envelope 78 containing a metal foil core 80 or, as shown in FIG. 8, a plastic 84 may encapsulate a metal screen or mesh 86. In either case, a gasket 82 may be used in conjunction with the separator plates to further improve the seal therebetween, particularly in the event that the separator plates are more rigid than would be normal if composed entirely of plastic. Of course, suitable ports and slots may be provided in the separator plates, and in the gaskets if used, by drilling, molding, casting or other known techniques.

The films providing the heat exchange surfaces may be the same plastic materials as the separator plates or may be different materials with due consideration to compatibility with and inertness to the fluids passing therethrough. The thickness of the separator plates and films may be selected for suitable strength combined with effective heat exchange capacity. For example, the film may have a thickness of from about 1 to 20 mils whereas the separator plates may have a thickness in excess of 10 mils, for example, from about 20 to 100 mils, or other thickness effective for providing structural strength, to contain the pressure of the fluids, and to help to insulate the fluids from heat loss due to ambient conditions. However, the thickness should not be so great that the flow cross section in the slots is increased, thereby decreasing the film heat transfer coefficient by decreasing the fluid velocities in the slots.

The films may also be produced from polymers permeable to water or other vapors, such as polystyrene, or microporous polymer films, thereby permitting not only heat exchange but also humidification or dehumidification, particularly in connection with ventilation systems, or selective separation of gaseous species or particulates, particularly in connection with chemical recovery and purification systems.

The all-plastic plate-type heat exchangers of the invention are designed for operation at low absolute pressures, for example, about 200–300 psig maximum, and for relatively small differential pressures between the fluids being interchanged. Higher absolute pressures may be tolerated, however, by increasing the strength and/or thickness of the materials of the heat exchange pack, particularly the periphery of separator plates. Higher differential pressures may also be tolerated by increasing the strength or thickness of the film as in FIGS. 7 and 8, and by varying the dimensions of the slots defining the flowpaths of the fluids. The heat exchangers of the invention are most effective at low to moderate temperatures since most plastics have a maximum service temperature below about 500° F.

Nevertheless, even with such limitations, the heat exchangers of the invention have applicability to a wide range of systems including heat exchange between two gases or between two liquids, or between a gas and a liquid, particularly where both are at about the same pressure. For example, in ventilation systems, especially where indoor air pollution is a concern in well insulated buildings, and in low humidity environments where water vapor permeable heat transfer films have special benefit. The systems of the invention also have outstanding benefits for liquid feed-product heat exchange in the chemical process industries, as in distillation columns, reactors, crystallizers, and the like.

In summary, the plastic plate-type heat exchangers of the invention have a wide variety of advantages over conventional heat exchangers. They can be fabricated from inexpensive materials and by automated polymer processing techniques, e.g., by molding or casting of the end plates and separator plates and by extrusion or blow molding of the films. The films may be bonded to the separator plates by adhesives, solvents, heat sealing, ultrasonic welding, or mechanical means. Moreover, the films can be molded or cast integrally with the separator plates, and assembly can be automated.

If the separator plates are made of flexible materials, the need for gaskets between the plates can be eliminated. If the peripheries of the separator plates and end plates are made of foamed or cellular plastic materials, the heat exchanger assembly is self-insulating, reducing or eliminating the need and consequent expense to install thermal insulation around the exchanger assembly. Baffles may be designed integral with the slots of the separator plates and the exchangers can be made smaller and lighter then conventional plate-type exchangers. For example, for a home fresh air/exhaust air interchanger, the required heat transfer surface can be reduced about 85%, the exchanger volume can be reduced about 83%, and floor space taken up by one unit reduced about 67%, as compared to the exchanger described in the *Popular Science* article cited above.

While the invention has been described in terms of several embodiments and numerous features and benefits enumerated, it will be understood and appreciated that many variations and other benefits are possible and come within the scope thereof, the appended claims therefore being entitled to a full range of equivalents.

What is claimed is:

1. A plate-type heat exchanger pack, effective for heat exchange at absolute pressures of 200–300 psig maximum and small differential pressures between fluids to be heat exchanged, comprising, in successive, stacked arrangement, a first end plate, a plurality of first plastic separator plates, a plurality of plastic separator films each having a thickness of about 1 to 20 mils, a plurality of second plastic separator plates and a second end plate, and further including means for locking the plates and films in said pack;

the first separator plate having a slot in the plane thereof bounded on an open side to the film to define a continuous flowpath for a first fluid, the second separator plate having a slot in the plane thereof bounded on an open side to the film to define a continuous flowpath for a second fluid, said first and second separator plates being positioned in a mirror image relationship to each other, said slots being positioned for slot to slot heat transfer through said film;

said first and second plastic separator plates having a thickness of at least 10 mils but not greater than a thickness which will increase the cross-flow section in said slots to thereby decrease the film heat transfer coefficient by decreasing the fluid velocity in said slots, said first and second separator plates arranged alternately in said pack with a separator film disposed between each pair of separator plates;

the pack having a first channel extending transversely through the separator plates and film and communicating with the slot in the first separator plate for passage of the first fluid, and futher including a second channel extending transfersely through the separator plates and film and communicating with the slot in the second separator plate for passage of the second fluid.

2. The heat exchanger of claim 1 wherein the slots are shaped to define baffle surfaces along their edges.

3. The heat exchanger of claim 1 wherein the slots define serpentine flowpaths and the channels are disposed such that the flow of fluids is parallel in the respective slots.

4. The heat exchanger of claim 1 wherein the slots define serpentine flowpaths and the channels are disposed such that the flow of fluids is serial in the respective slots.

5. The heat exchanger of claim 1 wherein the separator plates contain reinforcing metal.

6. The heat exchanger of claim 5 wherein the reinforcing metal is metal foil and further including a gasket in contact with each separator plate or film.

7. The heat exchanger of claim 5 wherein the reinforcing metal comprises wire mesh.

8. The heat exchanger of claim 2 wherein the slots are formed as cutouts in the separator plates whereby the baffle surfaces are integral with the separator plates.

9. The heat exchanger of claim 1 wherein each separator plate is formed integral with an adjacent film.

10. The heat exchanger of claim 1 wherein the end plates are plastic and the locking means comprises adhesive bonding between the plates and films.

11. The heat exchanger of claim 1 wherein the end plates are plastic and the locking means comprises mechanical fasteners.

12. The heat exchanger of claim 1 wherein the end plates are plastic and the locking means comprises solvent, fusion or ultrasonically bonded interfaces between the plates and films.

13. The heat exchanger of claim 1 wherein the slots are formed as cutouts in the separator plates and the cutouts are shaped to define baffle surfaces along their edges, whereby the baffle surfaces are integral with the separator plates.

14. The heat exchanger of claim 1 wherein the film is permeable to water or other specific vapors or gases.

15. The heat exchanger of claim 1 wherein the films are permeable to water or other specific vapors or gases.

* * * * *